United States Patent [19]

Silva et al.

[11] Patent Number: 4,876,638
[45] Date of Patent: Oct. 24, 1989

[54] LOW-NOISE SWITCHING POWER SUPPLY HAVING VARIABLE RELUCTANCE TRANSFORMER

[75] Inventors: Donald M. Silva, West Lafayette; Leroy F. Silva, Lafayette; Fred M. Fehsenfeld, Sr., Indianapolis, all of Ind.

[73] Assignee: Electronic Research Group, Inc., West Lafayette, Ind.

[21] Appl. No.: 154,863

[22] Filed: Feb. 10, 1988

[51] Int. Cl.⁴ .......................................... H02M 3/337
[52] U.S. Cl. ..................................... 363/97; 323/250; 363/23; 363/133
[58] Field of Search ....................... 363/22, 23, 31, 97, 363/133, 25, 82; 331/113 A; 323/247, 249, 250, 331, 345, 254

[56] References Cited

U.S. PATENT DOCUMENTS

| | | | |
|---|---|---|---|
| 3,660,749 | 5/1972 | Kadri | 363/23 |
| 4,177,418 | 12/1979 | Brueckner et al. | 323/250 |
| 4,327,348 | 4/1982 | Hirayama | 323/250 |
| 4,342,075 | 7/1982 | Hiromitsu | 363/23 |
| 4,737,704 | 4/1988 | Kalinnikov et al. | 323/331 |
| 4,782,437 | 11/1988 | Nishiyama et al. | 363/97 |

FOREIGN PATENT DOCUMENTS

| | | | |
|---|---|---|---|
| 267943 | 12/1913 | Fed. Rep. of Germany | 323/331 |
| 1939278 | 2/1979 | Fed. Rep. of Germany | 363/134 |
| 3125241 | 4/1982 | Fed. Rep. of Germany | 363/25 |

Primary Examiner—William H. Beha, Jr.
Attorney, Agent, or Firm—Frost & Jacobs

[57] ABSTRACT

There is provided a low-noise switching power supply for producing a regulated output voltage from an unregulated supply. The power supply includes a main transformer having first, second and third legs. A primary winding associated with a first leg produces an alternating magnetic flux in the core. A load winding associated with a second leg produces the output voltage from the power supply. A control winding is associated with the third leg. The regulated output voltage is compared to a reference voltage and used to operate a control circuit which alternately short circuits the control winding so as to vary the reluctance pass in the transformer and maintain the output voltage at a substantially constant predetermined value. A feedback circuit including a coupling transformer connects the primary coil to the switching circuit to improve regulation and provide a "soft start" capability.

17 Claims, 5 Drawing Sheets

LOW-NOISE SWITCHING POWER SUPPLY HAVING VARIABLE RELUCTANCE TRANSFORMER

BACKGROUND OF THE INVENTION

1. Field of the Invention

The present invention relates generally to control of direct current power to electronic loads, and more particularly to a fully regulated, all electronic switching DC power supply having excellent regulation and low noise.

2. Description of Related Art

The field of electronic power supplies, and in particular electronic switching DC power supplies, has been closely studied for many years and is extremely well developed. As is well known, the primary source of power in such circuits may be from the alternating current power lines (e.g. 120 v, 60 Hz), or from another source of direct current power that is either unregulated or at a voltage level not suitable for the electronic load being supplied. It is a usual requirement of such electronic loads that the voltage supplied be regulated to a fraction of a percent over a wide range of load currents, supply voltages, and operating temperatures. As used herein "unregulated" means the voltage, generally from one of the sources of supply just described, which is to be used as the supply source for the power supply of the present invention.

Generally, regulated power supplies are of two basic types: linear power supplies and switching power supplies (usually called switchers). The linear power supplies are capable of high quality regulating performance, but suffer from relatively low overall efficiency since they regulate the output voltage by deliberately dissipating power in an electronic regulating circuit.

Common methods for providing extra regulation for outputs in linear power supplies which do not have direct feedback to the source are a linear series pass regulator or a switching buck regulator. Examples of these regulators are found in section 9 of "Linear-/Switchmode Voltage Regulated Handbook", Motorola Incorporated (1982 Edition) and "TMOS Power FET Design Ideas", Motorola Incorporated (Issue A, 1985 Edition). These types of circuits involve the use of a regulating element, which is usually a transistor. Since the output cirrent flows through the regulating element, a substantial amount of power is thereby dissipated. The regulating elements in the associated heat sink must therefore be of sufficient size and durability to withstand the environment. While these types of regulators are functional, they are undesirable because of the size and cost of the components required and the power wasted in the form of heat.

Switching power supplies usually regulate the output voltage by controlling the duty cycle of the switching transistors that produce an alternating (square wave) voltage at the primary of the main transformer. The transformer, through its normal transformer action, steps the primary voltage up or down to the desired level compatible with the load circuit. Switching power supplies have higher efficiencies than linear power supplies because the transistors that drive the primary winding of the main transformer are either saturated or cut-off. This minimizes the power that is dissipated in these elements since no current flows through the transistors when the voltage is at its maximum value across the transistors, and the maximum current flows through the transistors when the voltage is a minimum (the saturation value) across the transistors. By controlling the duty cycle of the switching transistors, the average value of the transformed voltage can be varied, thus exerting control over the output voltage (and consequently the load voltage) in response to feedback regulating signals from the load.

A circuit for regulation of a DC output voltage in a switching power supply is shown in U.S. Pat. No. 4,375,077, which issued to J. Williams on Feb. 22, 1983. This circuit contains a control transformer having primary, secondary and control windings. The output of the circuit is connected from the primary and secondary windings and is controlled by a switching element connected from the control winding. The voltage output error is provided to the duty cycle modulation circuitry, which varies the duty cycle of the switching element and thereby controls the output voltage level.

Most commercial switching power supplies, as seen in the Williams reference, use a driven type of circuit in which the switching transistor(s) is driven from a completely separate circuit. In addition, these power supplies do not utilize any feedback signals from the main transformer. The duty cycle or pulse width modulation circuitry operates on this separate circuit to provide the required regulating action. An undesired by-product of this pulse width modulation scheme, however, is the production of high frequency noise signals as a result of the narrow, high current pulses induced in the transformer by the switching transistors. Because the main transformer is connected either directly or indirectly to the source of line power, these noise pulses will be carried to the line (or load) if special and expensive filtering techniques are not employed.

Another class of power supplies utilize a current limiting transformer to provide a high voltage that fires a spark gap for igniting liquid or gaseous fuels. The high voltage is required to ionize and break down the spark gap and the current limiting feature limits the current that flows through the gap, which has a relatively low voltage across it once the spark has been formed.

For example, a current limiting power supply for electron discharge lamps which utilizes a transformer like that described above is found in U.S. Pat. No. 4,414,491, which issued to W. Elliott on Nov. 8, 1983. In this arrangement, the power supply includes a high frequency inverter circuit coupled to an electron discharge lamp load through a special purpose transformer. The transformer is wound on a saturable ferromagnetic core structure forming a first magnetic flux path coupling the primary and secondary windings of the transformer and a second shunt magnetic path including an air gap which carries an increasing share of flux as load current increases. The switching of the inverter circuit occurs in response to the partial saturation of the core. Auxiliary windings may be serially connected with the primary winding of the transformer and wound about the shunt magnetic path to enchance the current regulating properties of the supply.

In a similar type of arrangement, U.S. Pat. No. 4,562,382, which issued to W. Elliott on Dec. 31, 1985, illustrates a solid-state inverter which utilizes a multiple core transformer. The multiple core transformer includes a high-permeability saturable core upon which both the primary and secondary windings are wound, and one or more lower permeability non-saturating cores upon which the primary and/or secondary windings are wound to provide additional self-inductance. The inverter switching transistors drive the two halves of the transformer's center-tapped primary winding on alternate half-cycles under the control feedback winding which is wound on the saturable core. A non-saturating core about which the primary winding is wound, and a capacitor connected in parallel with both halves of the primary winding, protects the switching transistors against transients, prevents the saturating core from going into hard saturation, and efficiently transfers energy stored in a leakage inductance of the primary windings from half-cycle to half-cycle. The multicore transformer is assembled by means of bobbin wound primary and secondary windings through which the center leg of ferrite E-core shapes may be inserted to provide the desired saturating and non-saturating flux paths.

SUMMARY OF THE INVENTION

As will be explained in more detail hereinafter, the present invention avoids these problems of prior art power supply circuits be eliminating pulse width modulation of the control current in the switching transistors. In a preferred embodiment of the present invention, the power supply comprises a transformer including a transformer core with first, second and third core legs. The third core leg is provided with an air gap. The transformer is also provided with a set of transformer windings including a control winding associated with the first core leg, a primary winding associated with the second core leg, and a load winding associated with the third core leg for producing the regulated output voltage from the power supply.

The power supply of the present invention is also provided with control circuitry for controlling and regulating the output voltage. In the preferred embodiment, this control circuitry includes switching means comprising switching transistors which utilize the unregulated supply voltage to provide an oscillating voltage to the primary winding of the transformer. A comparison circuit monitors the actual output voltage at the load winding and compares it with a reference representative of the desired output voltage value to produce an error signal representative of the difference between the actual output voltage and the reference. The error signal is applied to a switching circuit which short circuits the control winding as required to maintain the output voltage at the desired value.

Consequently, in the present invention, an alternating magnetic flux is established in the core, and is modulated by varying the reluctance of a portion of the transformer core so as to maintain the output voltage at a substantially constant predetermined value.

Consequently, in the present invention, it is not necessary to modulate the control current in the switching transistors, which often leads to large switched currents and inherently induced noise. Instead, the magnetic flux is switched in and out of the load coil that is on one of the legs of the main transformer and the pulse width of the main switching currents is left undisturbed. In this way, a source of noise production, as well as the subsequent need for noise filtering, is eliminated. Pulse width modulation is utilized in the control winding and its driving circuitry in the present invention, but the leakage reactance of the main transformer effectively isolates the noise pulses from the power source and the load. The three-legged main transformer, with the control coil, primary coil, and load coil on separate legs, has a naturally high leakage reactance. This offers several operating advantages, including resistance to overload, inherent noise filtering, and spike suppression. The regulating circuitry removes all of the disadvantages (such as poor load regulation) that a high leakage reactance structure would induce.

The present invention also employs a self-oscillating circuit that utilizes feedback from the main transformer (through a separate transformer circuit) in developing the driving signals for the switching transistors. As a result, desirable "soft start" action occurs, as well as reliable circuit operation over a wide range of line, load, and environmental conditions. Conventional switching power supplies, in contrast, use regulating schemes that are incompatible with self-oscillating switching circuits.

In addition to the foregoing advantages, since the switching power supply of the present invention is operated at frequencies considerably in excess of the 60 Hz line frequency, usually over 20 kHz, the transformers, filter chokes, and filter capacitors may be made smaller in size, resulting in significant savings in size and weight. Additionally, the present invention, with its special main transformer having a built-in high leakage reactance structure, provides naturally occurring energy storage features that inhibit switching transients. Therefore, the demands on the switching transistors with respect to voltage spikes are minimized.

The present invention permits a high efficiency switching power supply with a relatively low component count as compared to conventional switching power supplies. It uses low cost components, and has the capability of close line and load regulation performance. The self-oscillating design yields superior soft start action and operation over a wide range of input voltages.

BRIEF DESCRIPTION OF THE DRAWING

While the specification concludes with claims particularly pointing out and distinctly claiming the present invention, it is believed the same will be better understood from the following description taken in conjunction with the accompanying drawings in which:

DESCRIPTION OF THE PREFERRED EMBODIMENTS

Figure 1:
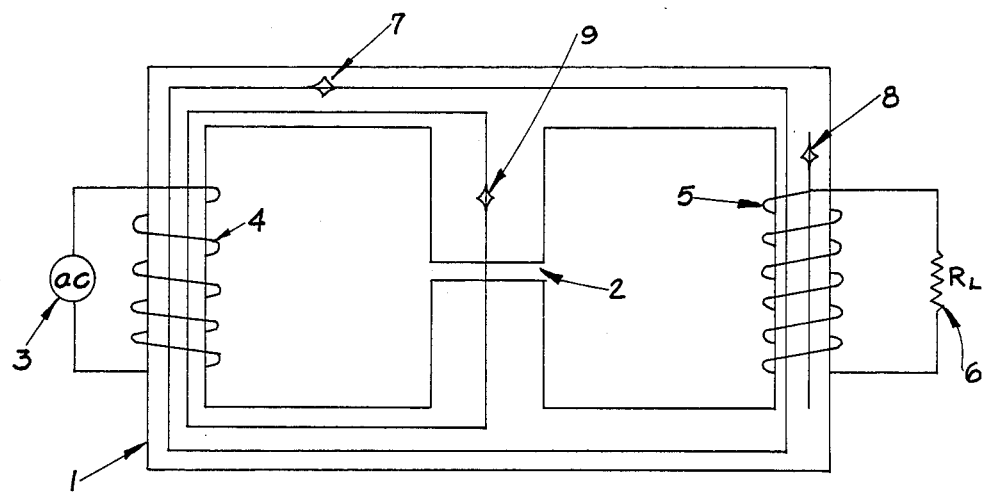
FIG. 1 is a schematic diagram depicting a typical air gap transformer.

As will be explained in more detail hereinafter, the switching power supply of the present invention utilizes a current limiting transformer in association with other elements to regulate the output load voltage. A typical current limiting transformer is shown in FIG. 1. Transformer core 1 has three legs, one of which has an air gap 2 in series with the magnetic path. At the option of the designer, the air gap 2 may be set to a value which is suitable for a given condition of operation, including zero. A source of alternating voltage 3 is connected to primary winding 4, which is located on one of the legs on the transformer that does not have an air gap. Another coil 5 is located on the other leg of the transformer without an air gap and is connected to load resistance 6.

Under conditions of relatively light load, the reluctance of the magnetic path traversed by magnetic flux 7 is lower than the path through the leg with air gap 2 since the reluctance of air gap 2 is significantly greater than that of the iron in the rest of the magnetic path. Therefore, most of the flux linking primary coil 4 links secondary coil 5, making the voltage induced in coil 5 approximately equal to primary voltage 3 multiplied by the turns ratio between coils 5 and 4.

If a relatively low load resistance is placed across coil 5, current will flow through coil 5 and load 6. The flow of this current produces counter-flux 8 which opposes flux 7. If a short circuit is placed across load coil 5, then the net flux through coil 5 will be approximately zero. In that case, the flux linking coil 4 will then be delivered through the leg of the transformer containing air gap 2, which is labeled as flux 9. However, sufficient net flux will be left linking coil 5 to maintain the short circuit current in load 6, which is much smaller than the current would be if the leg containing air gap 2 were not present.

Figure 2:
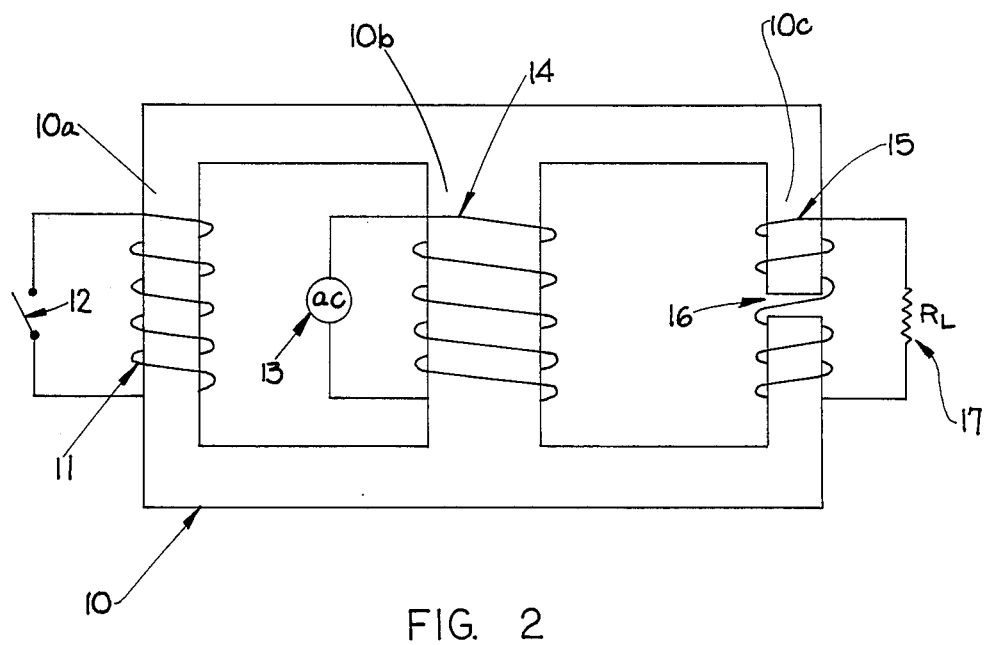
FIG. 2 is a schematic drawing depicting a variation of the current limiting transformer of FIG. 1, made in accordance with the present invention.
Figure 4:
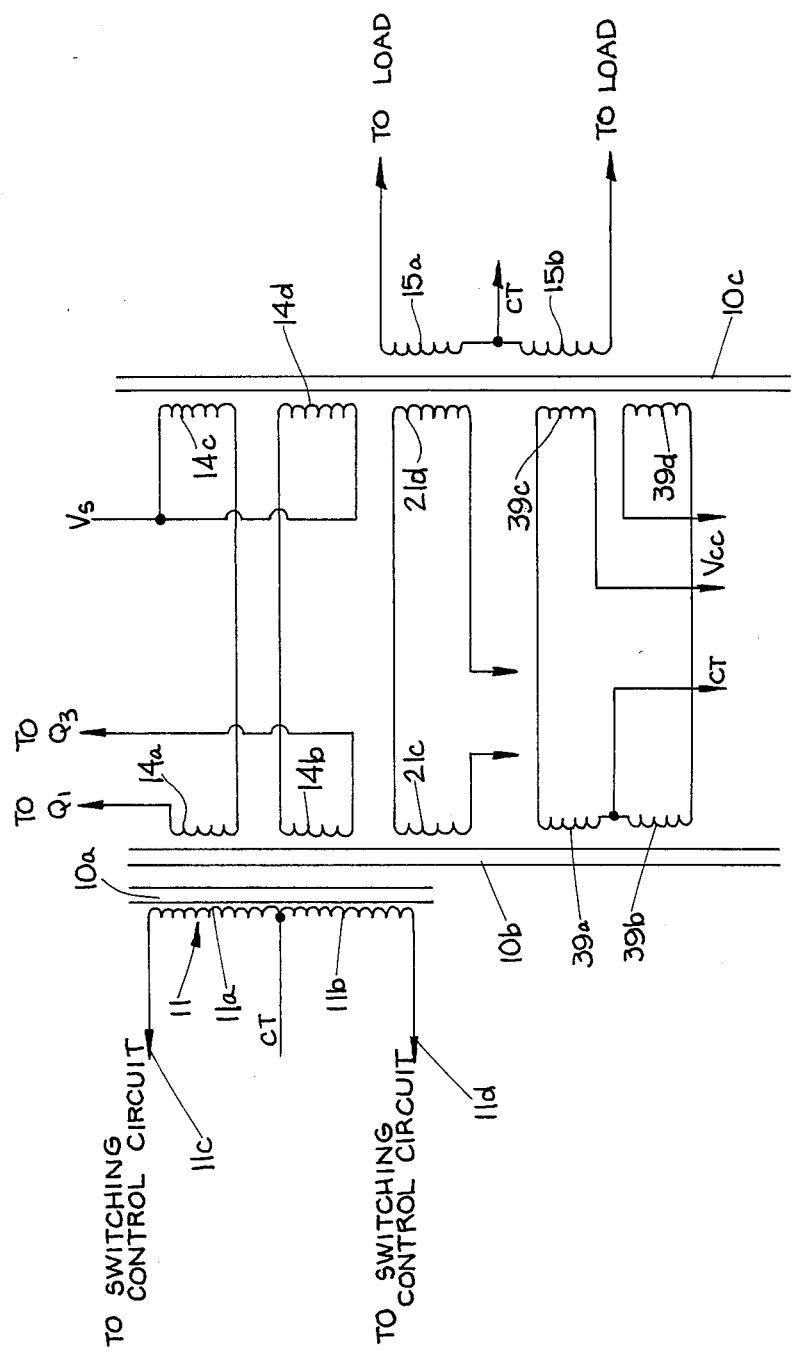
FIG. 4 illustrates the winding arrangement used with the transformer of FIG. 2.

A variation of the general structure of FIG. 1, as actually used in the preferred embodiment of the present invention, is shown in FIG. 2. In this arrangement, transformer core 10 is of the three-legged type, having legs 10a, 10b and 10c with one of the legs containing an air gap 16 similar to the structure of FIG. 1. Control coil 11 comprising winding portions 11a and 11b, together with center tap CT (as shown in FIG. 4), is located on one of the legs 10a without an air gap and is connected to schematically designated switch 12, which can be used to short circuit control coil 11. As used herein, "short circuit" means connecting together terminals 11c and 11d of control winding 11 (shown in FIG. 4) so as to reduce the impedance of the winding to a very low value. A source of alternating voltage 13 is connected to primary coil 14, which is installed on another leg 10b of the transformer without an air gap. Load coil 16 is installed on the leg 10c of the transformer with air gap 16 and is connected to load 17, which for purposes of illustration is shown as a resistance $R_L$. It will be understood that the length of air gap 16 may be set to determine the particular control characteristics of the circuit.

The action of the circuit in FIG. 2 resembles that of FIG. 1. When switch 12 is closed, thus short circuiting control coil 11, most of the flux linking primary coil 14 links load coil 15, allowing full voltage to be applied to load 17. Conversely, if switch 12 is opened, thus open circuiting coil 11, most of the flux linking primary coil 14 links control coil 11. The voltage induced in load coil 16, then, will be nearly zero. Thus, by varying the duty cycle with which switch 12 is opened and closed, the average value of the load coil voltage can be controlled.

If the primary alternating voltage is a square wave, the duty cycle of that voltage does not change during the load voltage controlling action described above. Only the duty cycle of the control coil voltage changes during the regulating action. If ideal switching elements are assumed everywhere in the circuit, then no power is dissipated during this regulating action. This basic circuit, then, has the capability of regulating action while still maintaining high overall circuit power efficiency.

Figure 3:
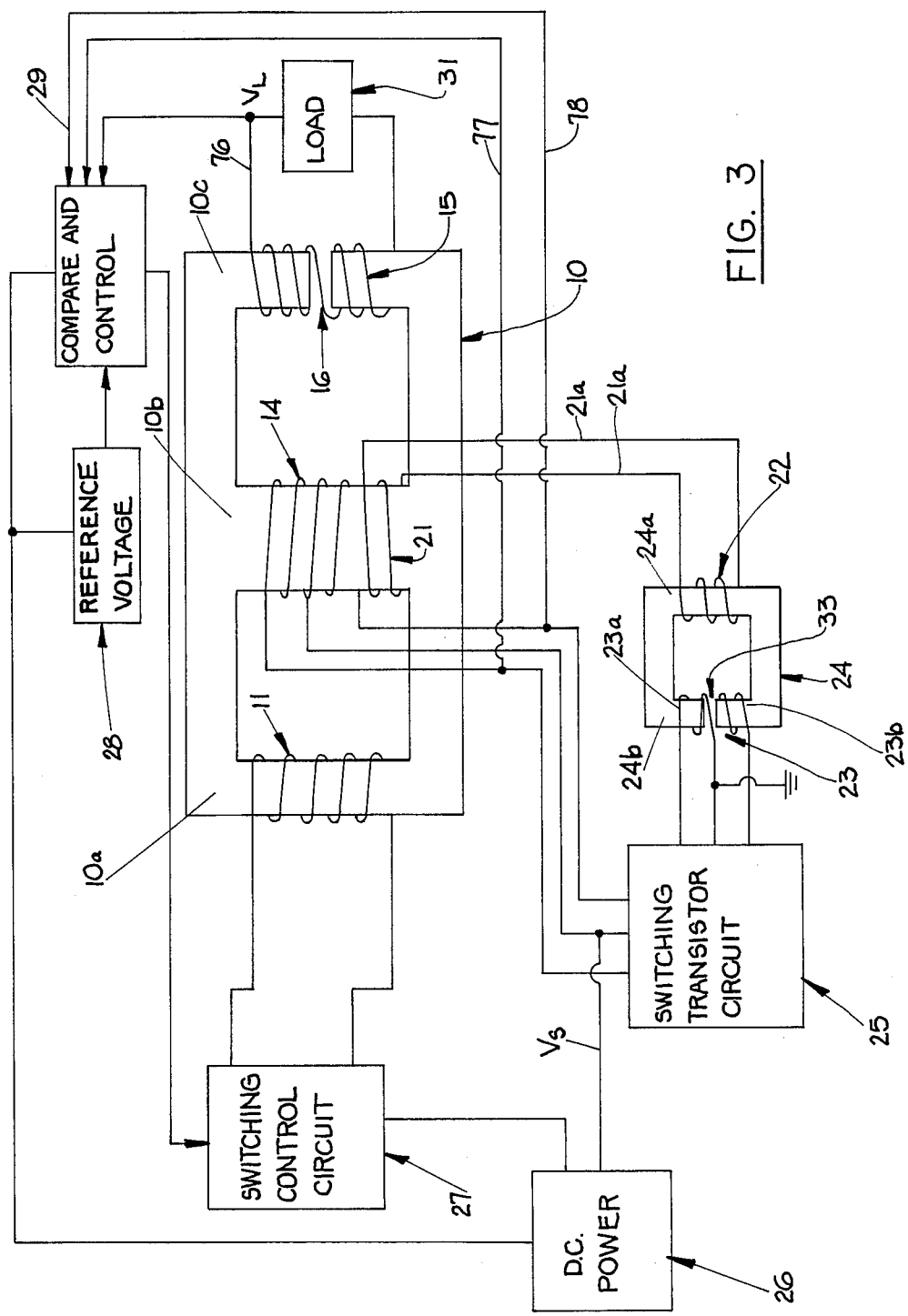
FIG. 3 is a schematic block diagram illustrating a preferred embodiment of the high-reliability, low noise switching power supply of the present invention wherein a portion of the circuit detail is not shown for clarity.

FIG. 3 illustrates a preferred embodiment of the subject invention utilizing the type of transformer described hereinabove with respect to FIG. 2 wherein elements similar to those previously described are similarly designated. In FIG. 3, some of the circuit detail is not shown for clarity, but all of the elements needed to realize a complete voltage regulated power supply are shown. As previously described, transformer core 10 incorporates legs 10a, 10b and 10c with associated control coil 11, primary coil 14, and load coil 15, respectively. The alternating voltage that is applied to primary coil 14 is generated in the switching transistor circuit 25, with the aid of feedback as will be described in more detail hereinafter. This feedback is derived from a feedback coil 21 associated with transformer leg 10b. Feedback coil 21 is connected via lines 21a to a wound primary coil 22 on leg 24a of coupling transformer core 24. Coil 23 on core 24 then feeds this feedback signal to circuit 25. Leg 24b of coupling transformer 24 is provided with a center-tapped secondary winding 24b in order to produce the symmetrical voltages required by switching transistor circuit 25. Coupling transformer 24 is also provided with an air gap 33, which may have a value of zero. It will be understood that this part of the circuit of FIG. 3 forms a feedback square wave oscillator, with the characteristics of the main transformer associated with core 10 chosen so that the core does not magnetically saturate, and the characteristics of the coupling transformer associated with core 24 chosen so that the core magnetically saturates during normal operation. In this way, the operating frequency of the square wave oscillator is determined principally by the coupling transformer associated with core 24.

In operation, DC power is furnished to the oscillating circuit through the center tap 20 of coil 14. In the present invention, a novel variation of the standard feedback square wave oscillator circuit is developed with the use of air gap 33 in core 24. This air gap tilts (or shears) the hysteresis loop of coupling transformer core 24 so that a given current excursion in primary coil 22 produces a flux density excursion in the core that depends on the length of the air gap. For a given choice of core area, coil turns, and coil voltage, the operating frequency of the circuit is inversely proportional to the peak flux density excursion. Therefore, the length of air gap 33 can be used to set the operating frequency of the circuit, which, in turn, when coupled with the high leakage reactance structure of the main transformer associated with core 10, establishes the nominal value of the load output voltage produced by load coil 15. In the present invention, these components are chosen to provide an operating frequency of 20 $KH_z$, or greater.

Switching control circuit 27 is used to apply a controlled short circuit to control winding 11. Circuit 27 receives its control signals from compare and control circuit 29, which compares the load voltage at load 31 to a reference voltage 28. If the output voltage varies above or below the desired value for any reason, circuit 29 will cause the duty cycle of the short circuit applied by switching control circuit 27 to control coil 11 to be varied in such a way as to keep the average value of the voltage produced by load coil 15 substantially constant.

In the present invention, the duty cycle of the voltage produced by switching transistor circuit 25 across primary coil 14 does not change during the regulating action of the power supply. Moreover, the pulses produced by switching transistor circuit 25 on lines 25a can be of relatively long duration, thereby reducing substantially the high frequency content of the electrical pulses on lines 25a and in the remainder of the electrical and magnetic circuit. This minimizes induced noise in the unregulated supply as well as load 31. While narrow control pulses may be generated in switching control circuit 27, these pulses are isolated from DC power supply 26 and load 31 by the leakage reactance of the main transformer associated with core 10. In contrast, prior art switching power supplies that pulse-width modulate the alternating voltage applied to the primary winding (and hence switch substantial current levels) require complex filtering schemes to prevent the appearance of noise pulses on the input or output lines.

It will also be observed that the type of self-oscillating circuit used in connection with the present invention permits the power supply to start easily with a soft start action and operate down to lower input (brownout) voltages, as opposed to the driven oscillator circuits used in contemporary switching power supplies. In addition, the power supply exhibits low noise operation and excellent voltage regulation with respect to load, line, or temperature variations.

Figure 5:
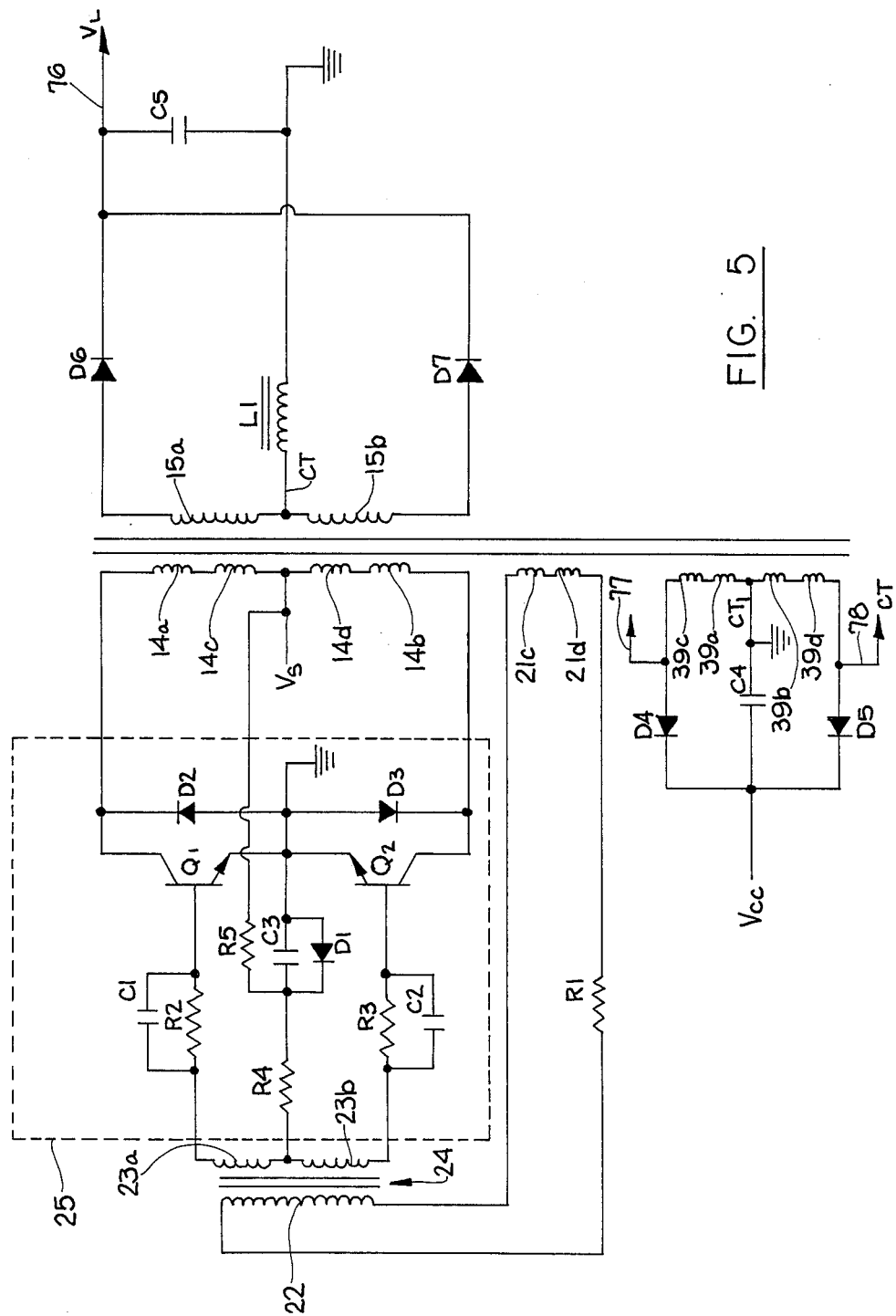
FIG. 5 is a schematic diagram of the switching portion of the power supply of the present invention.
Figure 6:
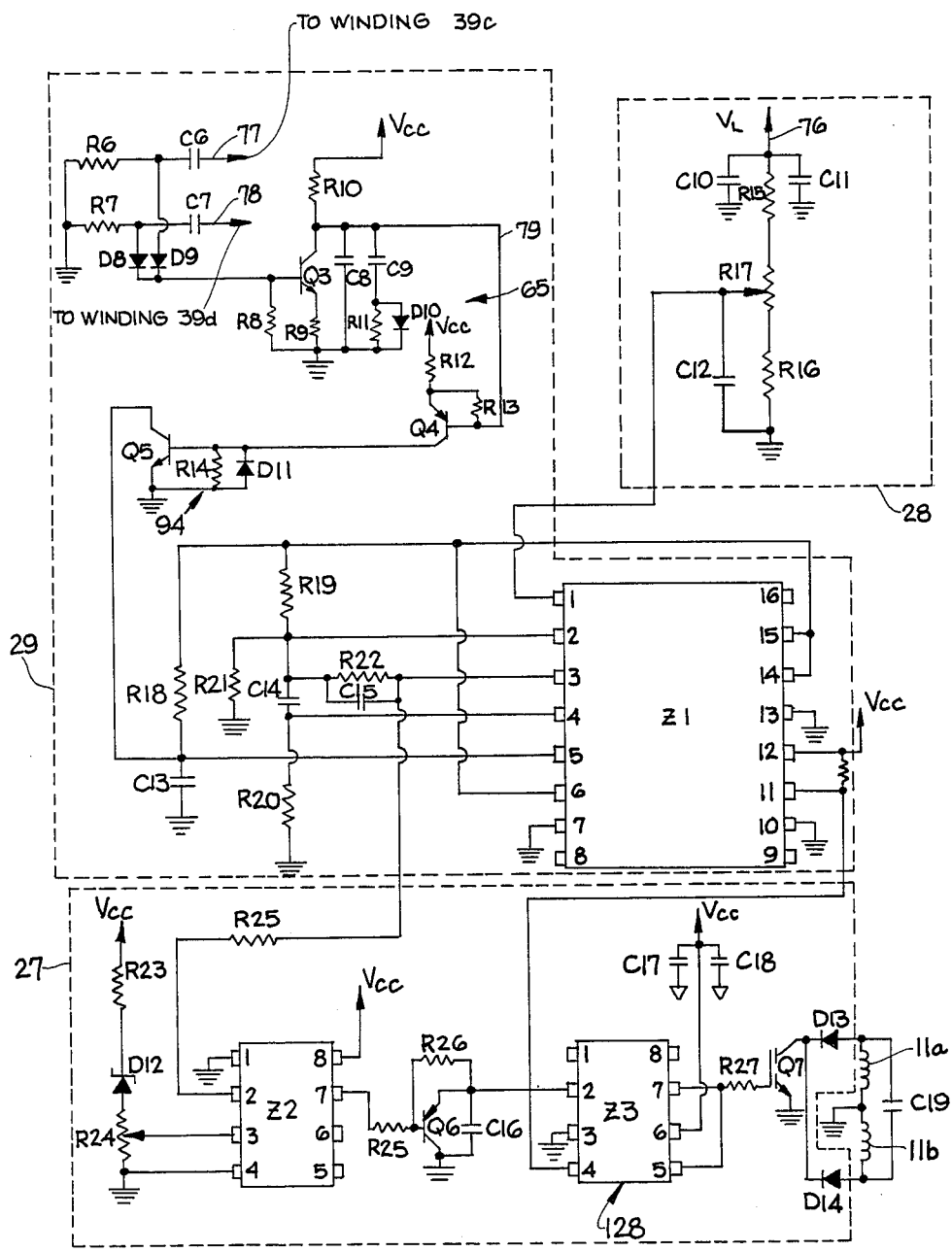
FIG. 6 is a schematic block diagram depicting the control circuit of the power supply of the present invention for regulating the voltage connected to the external load.

A complete exemplary preferred embodiment of the present invention is shown in FIGS. 4, 5 and 6, where elements similar to those previously described are similarly designated. FIG. 4 illustrates the modifications which have been made to the main transformer coil winding arrangement in order to control the leakage reactance and reduce interactions between load windings on the main transformer associated with core 10.

In this embodiment, primary coil 14 is distributed in winding sections 14a–14d in a ratio of 2:1 between legs 10b and 10c of the core, respectively. Winding portions 14a and 14b are positioned on leg 10b and are connected to the respective collectors of switching transistors Q1 and Q2 as will be described in detail hereinafter. Winding portions 14c and 14d are positioned on core leg 10c and form the center tap voltage $V_s$ as will also be described hereinafter.

Feedback coil 21 is also split into two portions 21c an 21d which are wound on transformer core legs 10b and 10c in the ratio of 2:1, respectively. The output of this coil is connected to coupling transformer 24 as will be described hereinafter.

Load coil 15 is split into two part 15a and 15b in order to form a center tap portion. Both load coil windings are positioned on transformer core leg 10c, and are connected to subsequent DC filters and the power supply load as will also be described hereinafter.

In order to provide internal working DC voltages for the power supply of the present invention, the main transformer is also provided with an additional winding 39 which is split into four winding portions 39a–39d. Winding portions 39a and 39b are provided on core leg 10b and winding portions 39c and 39d are provided on core leg 10c, in the ratio of 2:1. The output from winding 39 is used to provide the internally utilized DC voltage $V_{CC}$ as will be described hereinafter.

In order to minimize the leakage reactance between the primary coil and all other windings on the main transformer, a portion of primary coil windings 14c and 14d may be wound directly over load coil windings 15a and 15b. In addition, it is generally desirable to have a relatively large leakage reactance between control winding 11 and the other windings on the main transformer core in order to minimize noise pulse transmission from the control circuit to other portions of the power supply circuit.

FIG. 5 illustrates schematically the switching portion of the preferred embodiment of the present invention, with details of the transformer winding configuration shown in FIG. 4 deleted for clarity. As previously described, the main transformer is designed to avoid magnetic saturation during the switching action of the circuit, while core 24 of the coupling transformer is designed to magnetically saturate during the switching action of the circuit. Serially connected resistor R1 provides current limiting to prevent over-saturation of transistors Q1 and Q2.

As seen in FIG. 5, feedback windings 21c and 21d on the main transformer furnish a feedback signal to winding 22 on the feedback switching transformer 24. This signal is coupled to secondary windings 23a and 23b. Winding 23a is connected to the base of transistor Q1 through resistor R2, with parallel capacitor C1 serving as a speed-up capacitor to provide crisp switching action. Similarly, winding 23b is connected to the base of switching transistor Q2 through the parallel combination of resistor R3 and capacitor C2.

The biasing circuit formed by resistors R4 and R5, capacitor C3, and diode D1 are connected between input voltage source $V_s$ an the center tap of windings 23a and 23b to provide a bias that initiates the oscillation of the circuit. Diodes D2 and D3 protect transistors Q1 and Q2, respectively, from damage due to reverse voltage transients. The collectors of transistors Q1 and Q2 are connected, respectively, to primary coil windings 14a and 14b. Capacitor C20 and resistor R30 reduce overshoot in the collector voltages of Q1 and Q2. It will be understood that the circuit elements just described and enclosed within the dashed area shown in FIG. 5 form the switching transistor circuit 25 of FIG. 3.

Windings 39a–39d furnish a square wave voltage to diodes D4 and D5, where it is rectified and then filtered by capacitor C4. This circuit produces voltage $V_{CC}$, which is used to power the control system electronics.

Load windings 15a and 15b furnish a square wave voltage to rectifying diodes D6 and D7, as well as to a filter formed by inductor L1 and capacitor C5. This arrangement produces the output voltage $V_L$ on line 76 which is connected to load 31, as well as compare and control circuit 29 as described below.

The circuitry for switching control circuit 27, reference voltage 28 and compare and control circuit 29 is shown in FIG. 6, where elements previously described are similarly designated. In order to synchronize this circuitry with the oscillations in the main transformer, the square wave voltages from windings 39c and 39d on lines 77 and 78, respectively, are applied to capacitors C6 and C7 and resistors R6 and R7. Diodes D8 and D9 then combine these separate square voltages and apply the composite voltage to the base of transistor Q3, which is biased with resistors R8 and R9 and loaded with collector resistor R10. Capacitors C8 and C9, in conjunction with resistor R11 and diode D10, provide a series of negative-going pulses on line 79 that are synchronized with the oscillations in the main transformer. These pulses are applied to the base of transistor Q4, which, in conjunction with resistors R12, R13 and R14, diode D11, and transistor Q5, produces a positive-going synchronizing pulse at pin 5 of integrated circuit Z1. This integrated circuit, which may be a TL 494 (produced by several manufacturers) in a pulse width modulated control circuit that produces a pulse width modulated signal at pin 11 in response to a voltage level signal applied to the non-inverting error signal input port at pin 1. This error signal input signal is derived from the reference voltage circuit 28 formed by capacitors C10, C11, and C12, resistors R15 and R16, and variable resistor R17. The reference is connected to output load voltage $V_L$. Variable resistor R17 is used to set the level of output load voltage $V_L$ being regulated by controlling the magnitude of the voltage fed to pin 1 of integrated circuit Z1. The error signal amplifier being used in integrated circuit Z1 is frequency compensated by the network consisting of resistors R18-R21, and capacitors C13, C14 and C15. Resistor R22 is used to return the other input of the error amplifier to ground. The actual reference voltage, to which the voltage at pin 1 is being compared, is generated internally in integrated circuit Z1.

Generally, integrated circuit Z1 exhibits a natural offset in its control characteristic in response to a voltage level signal at pin 1. This offset is about 0.8V, and restricts the ability of the control signal to control the output signal pulse width from zero to its maximum value (one half of the oscillating frequency period). To overcome this shortcoming, circuitry is provided to produce a voltage to counteract the offset voltage. This is provided by integrated circuit Z2 (which may comprise a $\mu$A 311, produced by several manufacturers), which operates in conjunction with a reference voltage established by voltage $V_{CC}$, fixed resistors R23 and variable resistor R24, and Zener diode D12. Resistor R24 is adjusted to apply about 0.8V to pin 3 of voltage comparator Z2.

The error amplifier output signal appearing at pin 3 of Z1 is applied to pin 2 of voltage comparator Z2 through resistor R25. If the error amplifier output voltage is greater than the reference voltage established at pin 3 of voltage comprator Z2 (approximately 0.8 volts), then the output voltage at pin 7 of voltage comparator Z2 will be a higher level, thus cutting off driver transistor Q6.

Conversely, if the error amplifier output voltage at pin 3 of integrated circuit Z1 falls below the reference voltage at pin 3 of voltage comparator Z2 (approximately 0.8 volts) the voltage output at pin 7 of voltage comparator Z2 will become almost zero, causing transistor Q6 to turn on. Resistors R25 and R26 bias transistor Q6, while capacitor C16 suppresses transients in that circuit.

The output from transistor Q6 is connected to input pin 2 of integrated circuit Z3 which is a dual power MOSFET driver. Integrated circuit Z3 may be an ICL 7667 manufactured by GE/Intersil. When transistor Q6 turns on to drive input pin 2 of Z3 low, output pin 7 of circuit Z3 assumes a high level. Conversely, when transistor Q6 turns off, pin 7 of circuit Z3 assumes a low level.

The pulse width modulated output from integrated circuit Z1 appearing at pin 11 is connected to MOSFET driver input pin 4 of integrated circuit Z3. The driver output appears at pin 5, and is wired with the driver output from pin 7. This combined output is connected through resistor R27 to the gate of driver transistor Q7. Consequently, transistor Q7, a so-called COMFET device, will be turned on only when a pulse is produced by pulse width modulator circuit Z1 and the necessary offset threshold voltage has been exceeded as determined by the circuitry associated with integrated circuit Z2 as previously described.

The output of transistor Q7 is connected through diodes D13 and D14, respectively, to windings 11a and 11b of control winding 11. The diodes insure that unidirectional current flow will occur through transistor Q7 regardless of the polarity of the voltage induced in windings 11a and 11b. Capacitor C19 reduces high frequency spiking.

When transistor Q7 is conducting, control winding 11 will be shorted, thereby providing full output voltage to load winding 15. Conversely, when transistor Q7 is not conducting, control winding 11 is open-circuited and the voltage induced in load winding 15 will be reduced to nearly zero. Thus, by controlling the duty cycle of transistor Q7 as previously described, the value of the output load voltage $V_L$ may be precisely controlled.

In operation, upon application of primary power to the power supply, switching transistor circuit 25 begins oscillating via the feedback loop through primary coil 14, feedback coil 21 and the feedback transformer associated with transformer core 24. The frequency of oscillation is determined by the electronic element characteristic as previously described.

This oscillation induces a magnetic flux in main transformer coil 10, which causes an output load voltage $V_L$ to be produced from load coil 15 on output line 76. The magnitude of the output load voltage is sensed by compare and control circuit 29 and compared with the reference voltage established by reference voltage circuit 28.

If the output load voltage $V_L$ is lower than the desired output voltage as established by variable resistor R17 associated with the reference voltage circuit 28, the duty cycle of the switching voltage applied to switching control circuit 27 is ajusted by compare and control circuit 29 so as to increase the amount of time that control coil 11 is short circuited. This action causes more magnetic flux to flow in leg 10c of the main transformer winding, thereby increasing the average value of the output voltage $V_L$.

Conversely, if the output load voltage is higher than desired as determined by the setting of variable resistor R17, compare and control circuit 29 adjusts the duty cycle of the switching voltage applied to switching control circuit 27 so that control coil 11 is short circuited for a smaller percentage of the time. This causes less flux to flow in leg 10c of the main transformer core, thereby decreasing the average value of the output load voltage $V_L$.

In the situation where the output voltage is the exact value desired, the duty cycle of the switching voltage applied to switching control circuit 27 is maintained constant in order to maintain the output voltage constant.

It will thus be observed that during this regulating action, the pulse width (and frequency spectrum) of the switching waveforms of transistors Q1 and Q2 associated with switching transistor circuit 25 is not varied. Therefore, relatively little high frequency noise, compared to conventional switching power supplies, is transmitted to the load or input voltage source. Moreover, the relatively loose coupling between feedback winding 21 and the other windings prevents the noise associated with narrow pulses in that winding from being transmitted elsewhere in the circuit. Therefore, no extra noise suppression filtering is required in the circuit of the present invention.

It will also be observed that only two adjustments are required: resistor R17 must be set for the precise value of output load voltage $V_L$ required and resistor R24 must be set to eliminate the effect of the specific value of the offset voltage of integrated circuit Z1.

In tests, the power supply of the present invention has produced line/load regulation of 0.2% over a load variation of 20% of full load to full load and an input voltage variation from rated input voltage ± 10%.

We claim:

1. A low-noise switching power supply for producing a regulated output voltage from an unregulated supply including a non-saturating main transformer having a core with a variable reluctance path, a load winding associated with said core for producing said output voltage, means for producing from said unregulated supply an alternating magnetic flux in said core so as to produce said output voltage from said load winding, and means for varying the reluctance of at least a portion of said transformer core so as to maintain said output voltage at a substantially constant predetermined value, said transformer having a high leakage reactance whereby noise, pulses and voltage spikes are effectively isolated from said means for producing alternating magnetic flux and said load winding, said transformer further comprising first, second, and third legs, said third leg including an air gap therein, wherein the reluctance of a path through said second and third legs is greater than the reluctance of a path through said first and second legs, said load winding being associated with said third leg, said means for producing an alternating magnetic flux comprising a primary winding associated with said second leg and switching means responsive to the unregulated supply for providing an oscillating voltage of substantially constant frequency to said primary winding, whereby a voltage is induced in said primary winding and magnetic flux is produced by alternating voltage acting upon said primary coil.

2. The switching power supply of claim 1, said supply further comprising feedback means including:
   (a) a saturating coupling transformer having a core with first and second legs;
   (b) a primary coil associated with said first leg of said coupling transformer;
   (c) a feedback coil associated with said second core leg of said main transformer and connected to said primary coil on said first leg of said coupling transformer, wherein a feedback signal is generated by said feedback coil and coupled to said primary coil; and
   (d) a secondary coil on said second leg of said coupling transformer, connected to said switching means.

3. The switching power supply of claim 2 wherein said secondary coil is center-tapped to produce substantially symmetrical voltages.

4. The switching power supply of claim 2, wherein during operation of the power supply said main transformer does not magnetically saturate and said coupling transformer does magnetically saturate, whereby the operating frequency of said feedback means is determined primarily by said coupling transformer.

5. The switching power supply of claim 2, said feedback means further including an air gap in said second leg of said coupling transformer core, whereby a given current in said primary coil produces a flux density in said coupling transformer core that depends on the length of said air gap.

6. The switching power supply of claim 1, wherein said switching means produces switched voltage pulses across said primary coil of substantially constant duty cycle and of relatively long duration to thereby substantially reduce the high frequency content of electrical pulses in the remainder of said power supply.

7. A low-noise switching power supply for producing a regulated output voltage from an unregulated supply including a non-saturating main transformer having a core with a variable reluctance path, a load winding associated with said core for producing said output voltage, means for producing from said unregulated supply an alternating magnetic flux in said core so as to produce said output voltage from said load winding, and means for varying the reluctance of at least a portion of said transformer core so as to maintain said output voltage at a substantially constant predetermined value, said transformer having a high leakage reactance, whereby noise, pulses and voltage spikes are effectively isolated from said means for producing alternating magnetic flux and said load winding, said transformer further comprising first, second, and third legs, said third leg including an air gap therein, wherein the reluctance of a path through said second and third legs is greater than the reluctance of a path through said first and second legs, said means for varying reluctance comprising a control winding associated with said first leg and a switching control circuit, said control circuit short circuiting said control winding with a variable duty cycle to maintain the desired output voltage.

8. The switching power supply of claim 7, further comprising an error signal representative of the difference between said output voltage and a reference voltage, said switching control circuit being responsive to said error signal.

9. The switching power supply of claim 7, wherein said flux producing means comprises a primary winding associated with said second leg wherein most of said magnetic flux linking said primary winding links said load winding when said control winding is short circuited, whereby said output voltage tends to be a maximum.

10. The switching power supply of claim 7, wherein most of said magnetic flux linking said primary winding links said control winding when said control winding is not short circuited, whereby said output voltage tends to be a minimum.

11. A low noise switcing power supply for producing a regulated output voltage from an unregulated supply to a load, comprising:
   (a) a transformer including:
      i. a transformer core including first, second and third core legs, said third core leg including an air gap therein;
      ii. a set of transformer windings associated with said transformer including
         a. a control winding associated with said first core leg;
         b. a primary winding associated with said second core leg;
         c. a load winding associated with said third core leg for producing said output voltage;
   (b) and control means for controlling said output voltage comprising
      i. switching means responsive to said unregulated supply for providing an oscillating voltage of substantially constant frequency to said primary winding;

ii. means for comparing the actual output voltage produced at said load winding with a reference representative of the desired output voltage value to produce an error signal representative of the difference between said actual output voltage and said reference; and iii. means responsive to said error signal for short circuiting said control winding as required to maintain said output voltage at said desired value.

12. The switching power supply of claim 11, including feedback means comprising:

(a) a coupling transformer having a core with first and second legs;

(b) a primary coil associated with said first leg of said coupling transformer;

(c) a feedback coil associated with said second core leg of said main transformer and connected to said primary coil on said first leg of said coupling transformer, wherein a feedback signal is generated by said feedback coil and coupled to said primary coil;

(d) a secondary coil on said second leg of said coupling transformer connected to said switching means.

13. The switching power supply of claim 12 wherein said secondary coil is center-tapped to produce substantially symmetrical voltages.

14. The switching power supply of claim 12, wherein during operation of the power supply said main transformer does not magnetically saturate and said coupling transformer does magnetically saturate, whereby the operating frequency of said feedback means is determined primarily by said coupling transformer.

15. The switching power supply of claim 12, said feedback means further including an air gap in said second leg of said coupling transformer core, whereby a given current in said primary coil produces a flux density in said coupling transformer core that depends on the length of said air gap.

16. The switching power supply of claim 1, wherein said switching means produces switching voltage pulses across said primary coil of substantially constant duty cycle and of relatively long duration to thereby substantially reduce the high frequency content of electrical pulses in the remainder of said power supply.

17. The switching power supply of claim 11, said primary winding being associated with said first and second core legs wherein the leakage reactance of said transformer is controlled thereby.

* * * * *

UNITED STATES PATENT AND TRADEMARK OFFICE
CERTIFICATE OF CORRECTION

PATENT NO. : 4,876,638

DATED : October 24, 1989

INVENTOR(S) : Silva, et al.

It is certified that error appears in the above-identified patent and that said Letters Patent is hereby corrected as shown below:

<u>In Claim 11:</u>

Col. 12, Line 48: Change "switcing" to -- switching --.

<u>In Claim 16:</u>

Col. 14, Line 16: Change "claim 1" to -- claim 11 --.

Signed and Sealed this

Fifteenth Day of January, 1991

Attest:

HARRY F. MANBECK, JR.

*Attesting Officer*     *Commissioner of Patents and Trademarks*